United States Patent [19]

Bishop

[11] 3,939,307
[45] Feb. 17, 1976

[54] ARRANGEMENT FOR UTILIZING ALL PULSES IN A NARROW BAND CHANNEL OF A TIME-DIVISION MULTIPLEX, PULSE CODE MODULATION SYSTEM

[75] Inventor: Larry D. Bishop, Lynchburg, Va.

[73] Assignee: General Electric Company, Lynchburg, Va.

[22] Filed: Aug. 12, 1974

[21] Appl. No.: 496,478

[52] U.S. Cl. .......................... 179/15 A; 179/15 BY
[51] Int. Cl.² ............................................. H04J 3/00
[58] Field of Search ......... 179/15 A, 15 AD, 15 AF, 179/15 BY; 178/70 TS

[56] References Cited
UNITED STATES PATENTS

| | | | |
|---|---|---|---|
| 3,542,957 | 11/1970 | Mitchell | 179/15 BY |
| 3,610,832 | 10/1971 | Strobel | 179/15 BY |
| 3,663,760 | 5/1972 | DeWitt | 179/15 AF |
| 3,821,478 | 6/1974 | Hillman | 179/15 AF |

*Primary Examiner*—Kathleen H. Claffy
*Assistant Examiner*—Tommy P. Chin
*Attorney, Agent, or Firm*—James J. Williams

[57] ABSTRACT

In a carrier system having a plurality of relatively wide band (or voice) channels which are time-division multiplexed and represented by N sequential coded pulses for each channel, it is sometimes desirable that the individual pulses of one or more of the relatively wide band channels be used for information or data. In such past arrangements, only (N − 1) of the pulses were used for transmitting information. The Nth pulse was reserved as a needed keep-alive pulse to provide proper operation of repeaters in the pulse coded system. The present arrangement provides means at the transmitter for detecting when (N − 1) of the channel pulses are all in an undesired code condition, and transmitting the needed keep-alive pulse as the Nth pulse. If any one of the (N − 1) channel pulses is in the desired code condition, the Nth pulse can transmit information. At the receiver, means are provided for detecting when the (N − 1) channel pulses are all in the undesired code condition, and for causing the Nth pulse to continue producing the last representative pulse received. If any one of the (N − 1) channel pulses is in the desired code condition, the Nth channel pulse represents the information actually transmitted.

5 Claims, 5 Drawing Figures

TRANSMITTER

RECEIVER

FIG.4

| TRANS-MITTED | FRAME | | | | | | | | | | | | | | | |
|---|---|---|---|---|---|---|---|---|---|---|---|---|---|---|---|---|
| | 1 | 2 | 3 | 4 | 5 | 6 | 7 | 8 | 9 | 10 | 11 | 12 | 13 | 14 | 15 | 16 |
| DC1 | 1 | 0 | 0 | 0 | 0 | 0 | 0 | 0 | 0 | 0 | 0 | 0 | 0 | 0 | 0 | 0 |
| DC2 | 1 | 1 | 1 | 0 | 0 | 0 | 0 | 0 | 0 | 0 | 0 | 0 | 0 | 0 | 0 | 0 |
| DC3 | 1 | 1 | 1 | 0 | 0 | 0 | 1 | 0 | 0 | 0 | 0 | 0 | 0 | 1 | 0 | 0 |
| DC4 | 1 | 1 | 1 | 0 | 0 | 0 | 0 | 0 | 0 | 0 | 0 | 0 | 0 | 0 | 1 | 0 |
| DC5 | 1 | 1 | 1 | 0 | 0 | 0 | 0 | 0 | 0 | 0 | 0 | 0 | 1 | 0 | 0 | 0 |
| DC6 | 1 | 0 | 0 | 0 | 0 | 0 | 0 | 0 | 0 | 0 | 0 | 0 | 0 | 0 | 0 | 0 |
| DC7 | 1 | 1 | 0 | 0 | 0 | 0 | 0 | 0 | 0 | 0 | 0 | 0 | 0 | 0 | 0 | 1 |
| DC8 | 1 | 0 | 1 | 0 | 0 | 0 | 0 | 0 | 0 | 1 | 1 | 1 | 1 | 1 | 0 | 1 |
| KEEP ALIVE | | | | 1 | 1 | 1 | | | 1 | 1 | 1 | 1 | | | | |
| RECEIVED | | | | | | | | | | | | | | | | |
| DC1 | 1 | 0 | 0 | 0 | 0 | 0 | 0 | 0 | 0 | 0 | 0 | 0 | 0 | 0 | 0 | 0 |
| DC2 | 1 | 1 | 1 | 0 | 0 | 0 | 0 | 0 | 0 | 0 | 0 | 0 | 0 | 0 | 0 | 0 |
| DC3 | 1 | 1 | 1 | 0 | 0 | 0 | 1 | 0 | 0 | 0 | 0 | 0 | 0 | 1 | 0 | 0 |
| DC4 | 1 | 1 | 1 | 0 | 0 | 0 | 0 | 0 | 0 | 0 | 0 | 0 | 0 | 0 | 1 | 0 |
| DC5 | 1 | 1 | 1 | 0 | 0 | 0 | 0 | 0 | 0 | 0 | 0 | 0 | 1 | 0 | 0 | 0 |
| DC6 | 1 | 0 | 0 | 0 | 0 | 0 | 0 | 0 | 0 | 0 | 0 | 0 | 0 | 0 | 0 | 0 |
| DC7 | 1 | 1 | 0 | 0 | 0 | 0 | 0 | 0 | 0 | 0 | 0 | 0 | 0 | 0 | 0 | 1 |
| DC8 | 1 | 0 | 1 | 1* | 1* | 1* | 0 | 0 | 0 | 0* | 0* | 0* | 1 | 1 | 0 | 1 |

*ERROR

ARRANGEMENT FOR UTILIZING ALL PULSES IN A NARROW BAND CHANNEL OF A TIME-DIVISION MULTIPLEX, PULSE CODE MODULATION SYSTEM

BACKGROUND OF THE INVENTION

My invention relates to a time-division multiplex, pulse-code modulation system, and particularly to an arrangement that permits all of the sequential pulses of one or more relatively wide band (or voice) channels to be used to transmit information, particularly for data channels.

Communication systems using time-division multiplexing and pulse-code modulation are used to provide a plurality of relatively low noise, easily regenerated communication channels over a single communication circuit. One such system, designated the D2/D3 system by the Bell Telephone System, is described in considerable detail in "The Bell System Technical Journal," Volume 51, October 1972, beginning at page 1641. The D2/D3 system provides 24 relatively wide band (approximately 180 to 3,400 hertz) voice channels over two T1 lines, one line being used for each direction of transmission. In that system, the polarity and amplitude of the information in each of the 24 channels is sampled 8,000 times per second. This polarity and amplitude sample is encoded into eight binary pulses or bits, one bit representing polarity and the other seven bits representing amplitude levels from 64 down to one. The bits are sequentially combined for each channel, and the combined sequences for each of the 24 channels are sequentially combined to form what is designated a frame. In some applications, it is desirable or necessary that one or more of the relatively wide band voice channels be dedicated to or used for transmission of either wide or narrow band information or data. The pulses of each such dedicated channel can be used to provide a single wide band data channel or a plurality of narrower band data channels. The data rate of each data channel determines the needed band width or number of pulses for that channel. At first glance, it would appear that all eight pulses in the dedicated voice channel can be used for transmitting data. However, repeaters between a transmitter and receiver require that a pulse of selected characteristic or polarity be transmitted at least once during a sequence of eight pulses. Accordingly, previous systems which dedicated one or more wide band voice channels to information or data channels required that if N bits or pulses were present in a given channel, then only (N − 1) bits or pulses could be used for transmitting data or information, and that the other or Nth bit or pulse had to be reserved to transmit the necessary keep-alive bit or pulse for the repeaters in the system.

Accordingly, a primary object of my invention is to provide a new arrangement for use in a multi-channel, timedivision multiplex, pulse-code modulation system that permits all of the pulses or bits in a selected channel to be used for transmitting data or information.

Another object of my invention is to provide a new arrangement which permits all N pulses of a sequence of pulses to be used for transmitting data or information, and which provides the necessary keep-alive pulse when all but one pulse in a sequence fail to provide the necessary or keep-alive pulse.

Another and relatively specific object of my invention is to provide a novel transmitting circuit which detects the absence of a keep-alive pulse in all but one pulse in each sequence and provides such a keep-alive pulse in the time slot of that one pulse, and which also detects the presence of a keep-alive pulse in each sequence and permits all pulses in the sequence to represent information.

Another and relatively specific object of my invention is to provide a novel receiving circuit which detects the absence of a keep-alive pulse in all but one pulse in each sequence and causes a repetition of the previous pulse in the time slot of that one pulse, and which detects the presence of a keep-alive pulse in each sequence and permits all pulses in that sequence to be utilized.

SUMMARY OF THE INVENTION

Briefly, these and other objects are achieved in accordance with my invention by providing, in the transmitter of a time-division multiplex, pulse-code modulation system, means for detecting when all but one pulse of a sequence has an undesired condition, and for providing a pulse having the desired condition in the time slot of that one pulse. The detecting means also detects when any one of the pulses of a sequence has the desired condition, and then permits all pulses to represent actual information. In the receiver of a similar system, means are provided for detecting when all but one pulse of a sequence has the undesired condition, and for causing the pulse in the time slot of the one pulse to maintain its last valid condition. However, if any one of the pulses of a sequence has the desired condition, then all pulses can represent information to be transmitted. In this way, I provide keep-alive pulses when needed, but otherwise utilize all pulses in a sequence for transmitting information.

BRIEF DESCRIPTION OF THE DRAWING

The subject matter which I regard as my invention is particularly pointed out and distinctly claimed in the claims. The structure and operation of my invention, together with further objects and advantages, may be better understood from the following description given in connection with the accompanying drawing, in which:

FIG. 4 shows a table illustrating the operation of my invention.

DESCRIPTION OF THE PREFERRED EMBODIMENT

In the following description, I have shown my invention arranged for use with a D2/D3 multiplex system. However, it is to be understood that my improved arrangement can be used in almost any type of time-division multiplex, pulse-code modulation system.

Figure 1A:
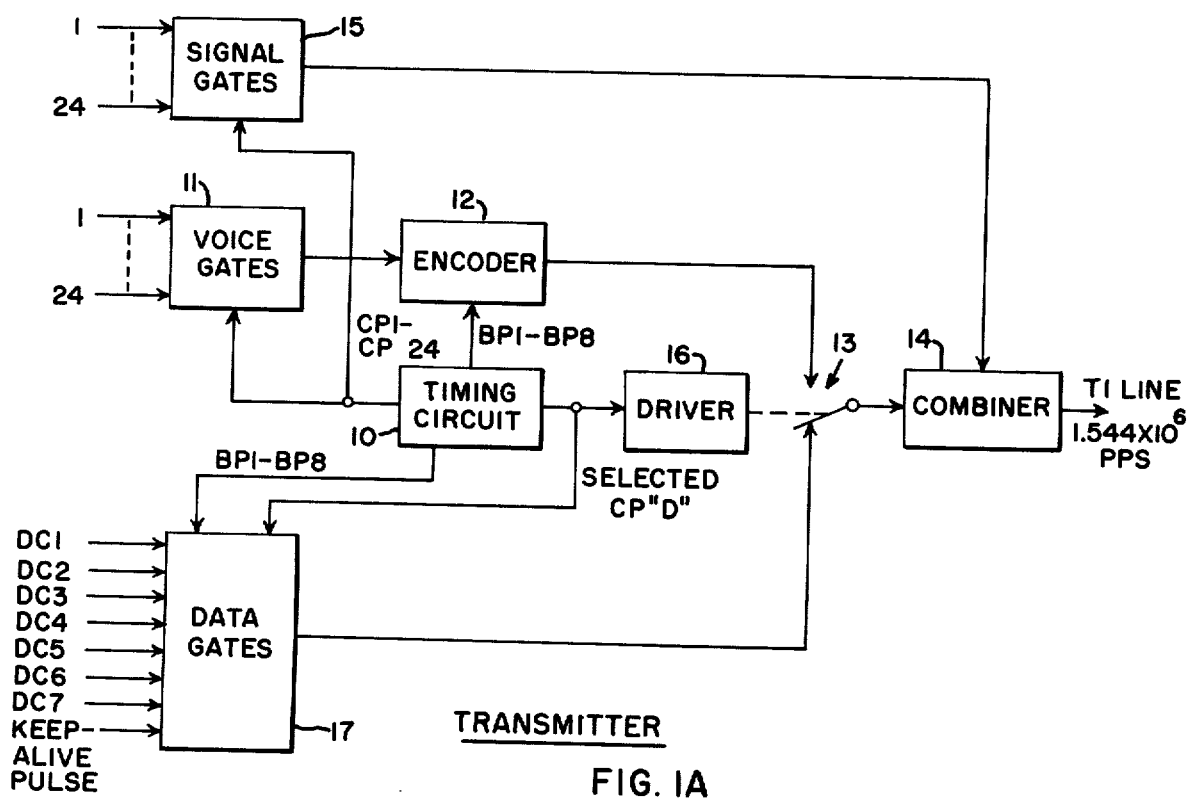
FIGS. 1A and 1B show a block diagram of a transmitter and receiver respectively of a time-division multiplex, pulse-code modulation system in which one relatively wide band voice channel is utilized for one or a plurality of data channels.
Figure 1B:
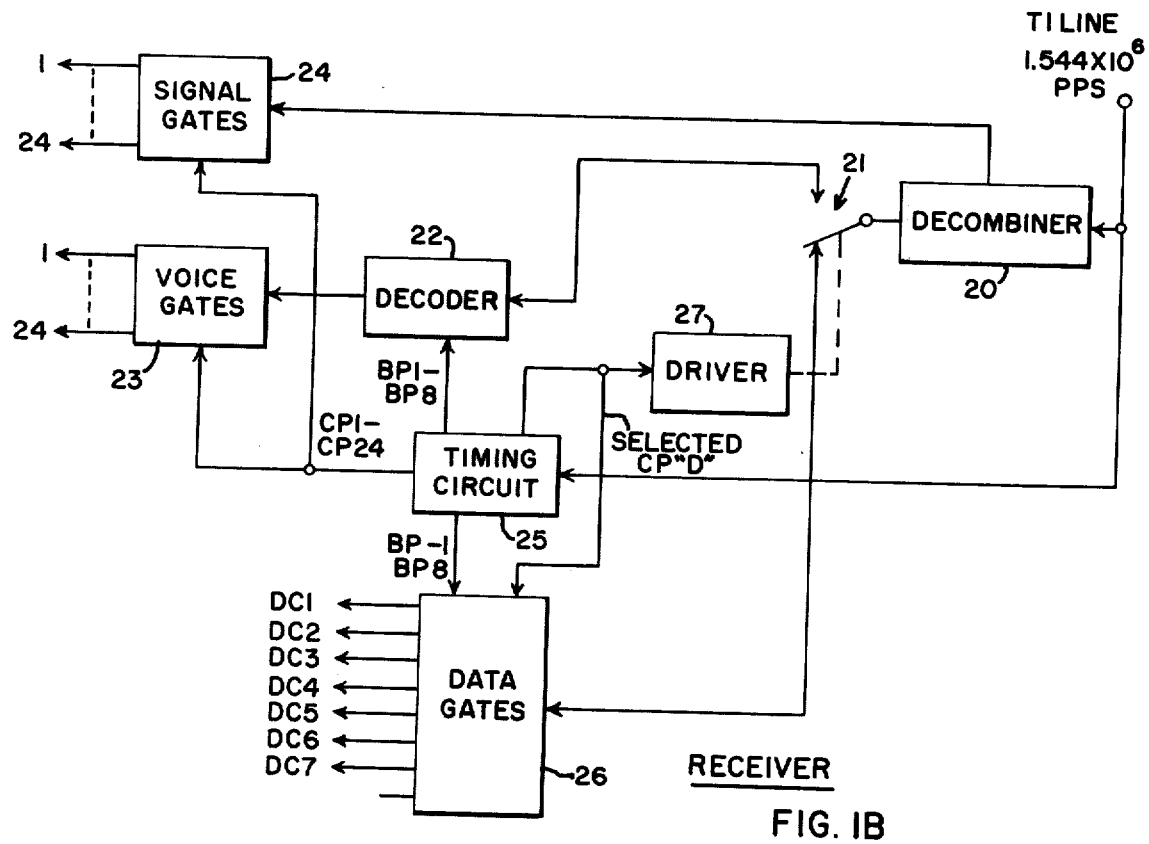

FIGS. 1A and 1B show a block diagram of one terminal of a D2/D3 system which may utilize my improved arrangement. FIG. 1A shows the transmitter and FIG.

1B shows the receiver. The transmitter shown in FIG. 1A is connected over a T1 transmission line through repeaters to a distant terminal receiver which could take the form of a receiver shown in FIG. 1B. Similarly, a distant terminal transmitter, which may be similar to the transmitter shown in FIG. 1A, is connected over a T1 transmission line to the receiver shown in FIG. 1B. In such a system, a typical voice channel has an upper frequency limit of around 4,000 hertz, so that an amplitude-sampling rate of twice this, or 8,000 hertz or pulses per second, has been selected in accordance with good engineering practice. Such a sampling rate insures reasonably good fidelity and quality for ordinary telephone conversations. The D2/D3 system provides 24 voice channels which are relatively wide band. In order that each voice channel amplitude sample can be adequately represented, 128 positive quantizing steps or amplitude levels and 128 negative quantizing steps or amplitude levels are recognized. This represents a total of 256 different steps or levels which, in binary code, require eight pulses or bits. The first pulse represents a positive or negative amplitude level. The second through the eighth pulses respectively represent amplitude levels of 64, 32, 16, 8, 4, 2 and 1. Thus, since each of the 24 channels comprises eight information pulses, this represents a total of 192 pulses. In addition, a single frame pulse is added at the end of channel 24 for framing or synchronization, so that each frame representing the 24 channels comprises a total of 193 pulses. If 8,000 samples per channel are taken each second, the pulse rate is 8,000 multiplied by 193, or 1.544 million pulses or bits per second.

In the transmitter, a timing circuit 10 supplies the basic clock or pulse frequency of 1.544 million pulses per second, and in addition, the following: channel pulses CP1 through CP24 for timing each of the channels; bit pulses BP1 through BP8 for the eight pulses in each channel; and framing pulses FP for timing the frames. Voice or information signals from the 24 channels are respectively applied to voice gates 11 which sample the amplitude of each voice channel and sequentially combine them and apply them to an encoder 12. The encoder 12 converts each of the amplitude samples into eight pulses that are binary coded to represent the polarity and amplitude of each sampled channel. These coded pulses are placed in sequence, and applied through an electronic switch 13 (represented by two contacts and a movable arm) to a combiner 14 which provides the sequence of pulses at the rate of 1.544 million pulses per second and applies these pulses to a T1 line. If none of the pulses in a sequence has the desired condition, a keep-alive pulse is inserted or stuffed in the time slot of a selected one of the pulses of that sequence. This insertion may be made at any suitable location, such as at the combiner 14. Signalling for the 24 channels is respectively applied to signal gates 15 which applies them in proper sequence or order to the combiner 14. The combiner 14 inserts the signals, when present, in the eighth bit of each channel of specified frames. All of the combined pulses are applied to the T1 line for transmission to a distant receiver.

In some applications, it is desirable that one or more of the voice channels be used for or dedicated to the use of data or telegraphic transmission. In the transmission of data, the speed of the data determines the needed band width or pulses per second. Thus, the speed of the data will determine whether one pulse of a channel sequence, or several pulses of a channel sequence, or all pulses of a channel sequence or sequences are needed for the data. In FIGS. 1A and 1B, I have assumed that a channel designated "D" (which may be any one or more of the 24 voice channels) is to carry this data information. The respective data information is applied from one or more data channels (designated DC1 through DC7) to respective data gates 17. In addition, a keep-alive pulse may be supplied to a respective gate 17 instead of to the combiner 14. These data gate pulses are sequentially applied to the switch 13 (at the lower contact). The switch 13 is operated by a driver 16 which connects the combiner 14 to the encoder 12 for appropriate voice channel times, and connects the combiner 14 to the data gates 17 for the selected D channel time to transmit data pulses when the D channel occurs. Thus, the pulses for the D channel are sequentially combined in the combiner 14 at the appropriate time. As mentioned, only seven (all but one) of the eight pulses for a dedicated data channel have been previously utilized, since it was necessary to provide a keep-alive pulse in case seven of the pulses were in an undesired condition (usually a logic 0). This eighth keep-alive pulse (usually a logic 1) was necessary for repeaters on the T1 line in order to provide proper synchronization and pulse restoration.

In the receiver shown in FIG. 1B, pulses from a distant transmitter are received over a T1 line at the 1.544 million pulses per second rate. These pulses are applied to a decombiner 20 which separates the pulses representing voice or information from the pulses representing signalling. The pulses representing voice are applied through an electronic switch 21 to a decoder circuit 22 which converts the coded pulses into amplitude samples, and applies the converted samples to respective voice gates 23. The voice gates 23 expand the converted signals and apply them to respective voice channels 1 through 24. Similarly, the signalling pulses are applied to signal gates 24 which respectively apply these signal pulses to the respective channels 1 through 24. In addition, a timing circuit 25 is provided to recreate the timing functions represented by framing pulses, channel pulses CP, and bit pulses BP. This timing circuit 25 utilizes the framing pulses F in order to insure that the receiver is in synchronization with the distant transmitter.

As in the case of the transmitter of FIG. 1A, I have assumed that channel D has been selected to provide seven pulses for supplying data signals. Accordingly, data gates 26 are provided with an input connected to the switch 21 which is operated by a driver 27. The data gates 26 receive the train of pulses during the time of the selected channel pulse D. Appropriate bit pulses BP1 through BP8 are also applied to the data gates 26 to provide the seven data channel outputs indicated as DC1 through DC7. Since the transmitter utilizes the eighth pulse of the selected channel D as a keep-alive pulse, only seven data channel outputs are supplied by the data gates 26. As mentioned, these seven outputs can supply one or more data channels, depending upon the data rate.

The transmitter and receiver described thus far in connection with FIGS. 1A and 1B are known in the art. It will be recognized that it would be most desirable if the eighth pulse in the selected data channel or channels could be used to supply information. However, as far as I am aware, no one has been able to do this because this eighth pulse was used to provide the necessary keep-alive pulse. However, in accordance with my invention, I provide a circuit arrangement for use in the transmitter and in the receiver that permits utilization of this eighth pulse for information and that also provides the necessary keep-alive pulse. Circuit arrangements in accordance with my invention are shown for the transmitter and receiver in FIGS. 2 and 3 respectively. These circuit arrangements utilize a number of known logic elements including a shift register, a multiple input NOR gate, an OR gate, an AND gate, a latch, and a storage circuit. As known in the art, a shift register can convert a single sequential series of input pulses to a parallel output, or can convert a parallel input to a sequential series of output pulses. A NOR gate is arranged so that if all its inputs are logic 0, the NOR gate produces a logic 1. If any of the inputs of a NOR gate is a logic 1, then the NOR gate produces a logic 0. An OR gate is arranged so that if any of the inputs is a logic 1, a logic 1 is produced at its output. If all of the inputs of an OR gate are logic 0, then the OR gate produces a logic 0. An AND gate is arranged so that if all its inputs are logic 1, the AND gate produces a logic 1. If any of the inputs of an AND gate is a logic 0, the AND gate produces a logic 0. A latch is provided with an input, an output, and a control input. If the control input is a logic 1, the latch unlatches to permit the output to follow the logic of the applied input. However, if the control input is at a logic 0, the latch unlatches and causes the output to retain the same logic present at the input just prior to the control input becoming a logic 0. And, of course, the logic 1 and logic 0 may take any magnitude or polarity.

Figure 2:
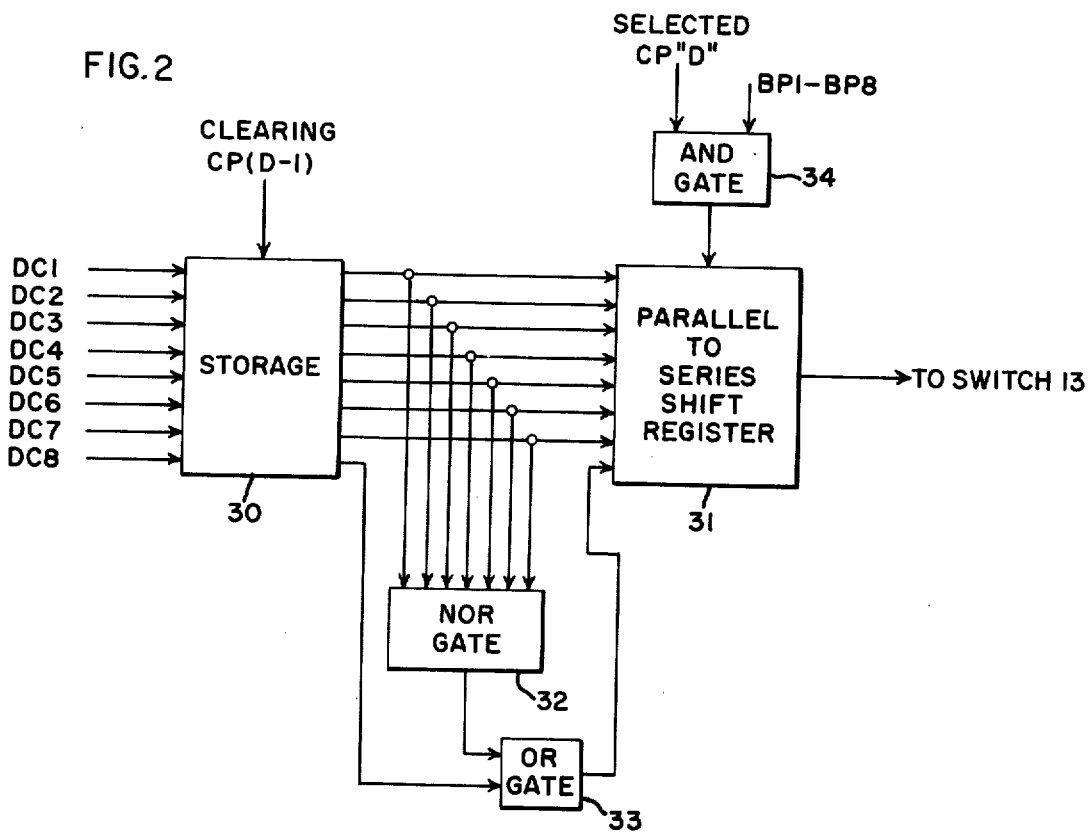
FIG. 2 shows a circuit in accordance with my invention for permitting all pulses in a channel sequence to transmit data information in the system of FIG. 1.

With specific reference to FIG. 2, the data channels DC1 through DC8 are applied to a storage circuit 30. The storage circuit 30 is arranged so that each of the inputs is stored at its output until the storage circuit is cleared, after which the output follows a subsequently applied input. Typically, the storage circuit 30 will be cleared at the channel pulse just prior to the time occurrence of the selected channel D, namely at the channel pulse (D − 1). The first seven outputs of the storage circuit are applied directly to respective parallel inputs of a parallel to series shift register 31. The same seven outputs are also applied to the inputs of a NOR gate 32. The output of the NOR gate 32 and the stored output for the data channel DC8 are applied to an OR gate 33, the output of which is applied to the eighth parallel input of the shift register 31. The output of the shift register 31 would be applied to the switch 13 and the combiner 14 in FIG. 1A. The shift register 31 is controlled by a two input AND gate 34, one of whose inputs receive the selected channel pulse D and the other of whose inputs receive the bit pulses BP1 through BP8. At the time of the selected channel pulse D, the eight inputs applied to the shift register 31 are dated through by the bit pulses BP1 through BP8 to a sequence of pulses which are applied to the switch 13 and combiner 14. If, at any time, the first seven outputs from the storage circuit 30 are all logic 0, the NOR gate 31 produces a logic 1 which is passed by the OR gate 33 and applied to the eighth input of the shift register 31. Thus, when this eighth input is gated out to the combiner 14, it provides a logic 1 which functions as a keep-alive pulse. However, if any one of the first seven outputs of the storage circuit 30 is a logic 1, the NOR circuit 32 produces a logic 0 which permits the OR gate 33 to truthfully follow the logic of the eighth data channel DC8. Under this condition, the eighth input for the shift register 31 and its corresponding sequential output truly follow the information or data present in the data channel DC8. Thus, the transmitter of FIG. 1 can provide data under all conditions except under the unusual circumstance when the first seven channels are at a logic 0. Under this unusual condition, the transmitter provides the necessary logic 1 keep-alive pulse.

Figure 3:
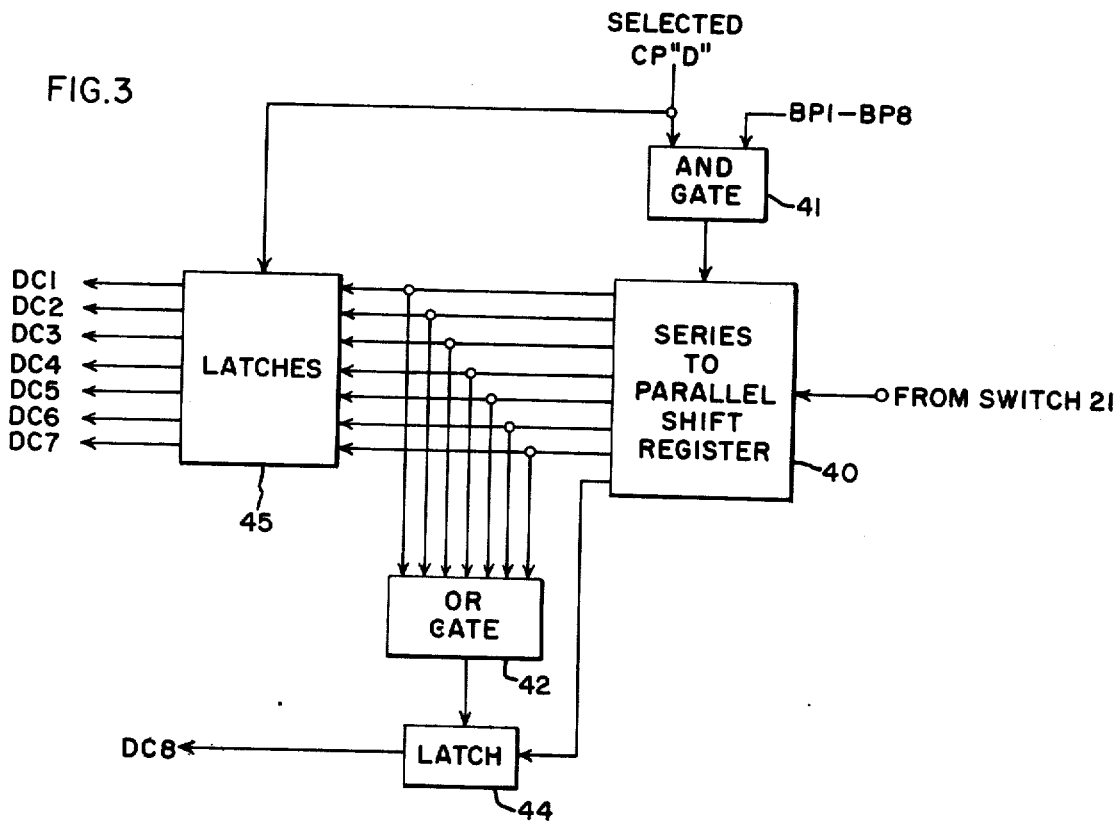
FIG. 3 shows a circuit diagram in accordance with my invention for receiving all pulses utilized to transmit data information in the system of FIG. 1.

With specific reference to FIG. 3, I show an arrangement for a receiver to be used with the transmitter of FIG. 2. FIG. 3 utilizes a series to parallel shift register 40 whose single input is received from the switch 21 and the decombiner 20 of FIG. 1B. The shift register 40 converts the sequential serial inputs to parallel outputs. The shifting is provided by applying the bit pulses BP1 through BP8 at the appropriate time of selected channel D by an AND gate 41. The first seven outputs are applied directly to latches 45, which in turn are connected to the receiving apparatus for the data channels DC1 through DC7. The latches 45 prevent the shifting output of the register 40 from reaching the receiving apparatus until unlatched by the selected channel pulse D. The first seven outputs of the shift register 40 are also applied to an OR gate 42. The output of the OR gate 42 is applied to the control input of a latch circuit 44. The data input of the latch circuit 44 is supplied by the eighth output of the shift register 40. The output of the latch circuit 44 is supplied to the receiving apparatus. When all of the first seven outputs of the shift register 40 are at a logic 0, the OR circuit 42 produces a logic 0 which latches the latch 44. Under this condition, the latch output retains its last valid input. Thus, the eighth data channel DC8 receives a signal that has the same logic that was previously received. However, if, as is typical, any one of the first seven outputs of the shift register 40 is at a logic 1, the OR gate 42 produces a logic 1 which unlatches the latch 44 and permits its output to follow the input. Thus, in the receiver, my circuit permits the eighth data channel DC8 to follow its true input signals under most conditions, except for the rare occurrence when the first seven data channels DC1 through DC7 are all logic 0. Under this relatively rare condition, the eighth data channel continues to receive the logic of the last valid received signal. However, any error resulting from this relatively rare occurrence is more than offset by the fact that an additional data channel or time slot is provided. If this data channel or time slot is used in a relatively slow speed circuit, the chances of a significant error are almost negligible.

FIG. 4 shows a table illustrating the operation of my circuit arrangement for a transmitter and for a receiver. In FIG. 4, the first eight lines show what a user actually transmits in the respective data channels or time slots DC1 through DC8 of a selected voice channel D. The next line shows when a keep-alive pulse is transmitted by the transmitter of the entire system. And the last eight lines show what a user actually receives in the data channels or time slots DC1 through DC8. Various possible combinations of conditions have been assumed in the 16 frames illustrated. In the first three frames, I have assumed that at least one of the data channels DC1 through DC7 is sending a logic 1. Under this condition, the data transmitted by the eighth data channel DC8 is truthfully received. However, in frame 4, I have assumed that all eight transmitted data channels DC1 through DC8 are a logic 0. Under this condition, the NOR gate 32 supplies a logic 1 to the eighth input of the shift register 31 so that a keep-alive pulse is provided. With respect to the data received, data channel 8 shows a logic 1 in frame 4. This logic 1 is an error, and is the stored logic 1 held over by the latch 44 from frame 3. The same conditions apply for frames 5 and 6. In frame 7, I have assumed that the data channel DC3 is a logic 1, and that at this time, data channel DC8 is a logic 0. The logic 1 of channel 3 serves as the needed keep-alive pulse, and also serves to cause the OR gate 42 in the receiver to produce a logic 1. This unlatches the latch 44 so that the transmitted logic 0 is truthfully received by data channel DC8. In frame 8, I have again assumed that all data channels are a logic 0. This causes the keep-alive pulse to be produced. At the receiver, data channel DC8 produces the previous logic 0 received in frame 7. The same condition applies for frame 9. In frame 10, I have assumed that the first seven data channels are a logic 0 and data channel DC8 is a logic 1. However, because the first seven data channels are a logic 0, the latch 44 is latched and continues to produce the logic 0 of frame 9. Thus, data channel DC8 produces a logic 0, which is an error. The same conditions apply for frames 11 and 12. In frame 13, when data channel DC5 transmits a 1, the latch circuit 44 is unlatched and data channel DC8 truthfully produces its received logic 1. Frames 14, 15, and 16 also show that data received in data channel DC8 is true and accurate since one of the earlier data channels produces a logic 1.

It will thus be seen that I have provided a circuit for use in a time-division multiplex, pulse-code modulation transmitter and receiver which permits all of the pulses forming a given voice channel to be utilized for data channels. My arrangement provides the necessary keep-alive pulses for repeater regeneration, but at the expense of very little error. Such error as may be present is, I believe, offset by the fast that an additional data channel or time slot is provided. And as I have already mentioned, if this data channel or time slot is used for relatively low speed data, very little error will be present. While I have shown only one embodiment of my invention, persons skilled in the art will appreciate that modifications may be made. As mentioned, my designated logic 0 and logic 1 is arbitrary and may represent any desired magnitude or polarity condition. For example, a keep-alive pulse may be a logic 0 rather than the assumed logic 1. Likewise, other types of logic circuits which achieve the same described results may be substituted. Thus, flip-flops and other arrangements may be used in place of the shift registers. Also, the keep-alive pulse may occur at any of the time slots in a channel, since a channel is momentarily stored in a typical system. And, the keep-alive pulses may be inserted at various locations in the system. I have shown the insertion at my transmitter and receiver for clarity and ease of understanding. And finally, the storage circuit 30 of FIG. 2 may actually be part of the shift register 31 so that the separate storage circuit 30 is not needed. Therefore, while my invention has been described with reference to a particular embodiment, it is to be understood that modifications may be made without departing from the spirit of the invention or from the scope of the claims.

What I claim as new and desire to secure by Letters Patent of the United States is:

1. In a carrier system having a plurality of relatively wide band, time-division multiplexed channels each represented by N sequential coded pulses, an arrangement for transmitting N data pulses in at least a selected one of said relatively wide band channels comprising:
   a. respective storage means for each of said N data pulses;
   b. parallel to series converting means having N inputs and one output for producing a sequential series of pulses in response to the pulses at said N inputs;
   c. means connecting (N − 1) of said storage means to a respective one of said inputs of said parallel to series converting means;
   d. means connected to said (N − 1) storage means for detecting the presence of an undesired state of all (N − 1) stored data pulses;
   e. means connected to the Nth storage means and to said detecting means for producing a pulse of desired state in response to said detecting means detecting said presence of an undesired state of all (N − 1) stored data pulses and for producing a pulse having the same state as the data pulse stored in said Nth storage means in response to the presence of at least one pulse of desired state stored in said (N − 1) storage means;
   f. and means connecting said last-named detecting means to the Nth input of said parallel to series converting means.

2. In a carrier system having a plurality of relatively wide band, time-division multiplexed channels each represented by N sequential coded pulses, an arrangement for receiving N data pulses in at least a selected one of said relatively wide band channels comprising:
   a. series to parallel converting means having one input and N outputs for producing a pulse at each of said N outputs in response to a respective pulse in a sequential series of pulses applied to said one input;
   b. detecting means connected to (N − 1) outputs of said series to parallel converting means for producing a first output in response to at least one of said (N − 1) outputs having a desired state and for producing a second output in response to all said (N − 1) outputs having an undesired state;
   c. latching means having an input, an output, and a control input, said latching means producing an output that follows said input in response to a first control input, and that produces an output that is the same as its previous input in response to a second control input;
   d. means for connecting said input of said latching means to the Nth output of said series to parallel converting means and means for connecting said control input to said detecting means, whereby said latching circuit produces said output that follows its input in response to said detecting means producing said first output and whereby said latching means produces an output that is the same as its previous input in response to said detecting means producing said second input;
   e. and utilizing means connected to said (N − 1) outputs of said series to parallel converting means and to said output of said latching means.

3. In a carrier system having a plurality of relatively wide band, time-division multiplexed channels each represented by N sequential coded pulses, an arrangement for transmitting and receiving N data pulses in at least a selected one of said relatively wide band channels comprising:
   a. respective storage means for each of said N data pulses;

b. parallel to series converting means having N inputs and one output for producing a sequential series of pulses in response to the pulses at said N inputs;

c. means connecting said output of said converting means to said system for transmission;

d. means connecting (N − 1) of said storage means to a respective one of said inputs of said parallel to series converting means;

e. means connected to said (N − 1) storage means for detecting the presence of an undesired state of all (N − 1) stored data pulses;

f. means connected to the Nth storage means and to said detecting means for producing a pulse of desired state in response to said detecting means detecting said presence of an undesired state of all (N − 1) stored data pulses and for producing a pulse having the same state as the data pulse stored in said Nth storage means in response to the presence of at least one pulse of desired state stored in said (N − 1) storage means;

g. means connecting said last-named detecting means to the Nth input of said parallel to series converting means;

h. series to parallel converting means having one input and N outputs for producing a pulse at each of said N outputs in response to a respective data pulse in a sequential series of pulses applied to said one input;

i. detecting means connected to (N − 1) outputs of said series to parallel converting means for producing a first output in response to at least one of said (N − 1) outputs having a desired state and for producing a second output in response to all said (N − 1) outputs having an undesired state;

j. latching means having an input, an output, and a control input, said latching means producing an output that follows said input in response to a first control input, and that produces an output that is the same as its previous input in response to a second control input;

k. means for connecting said input of said latching means to the Nth output of said series to parallel converting means and means for connecting said control input to said detecting means, whereby said latching circuit produces said output that follows its input in response to said detecting means producing said first output and whereby said latching means produces an output that is the same as its previous input in response to said detecting means producing said second output;

l. and utilizing means connected to said (N − 1) outputs of said series to parallel converting means and to said output of said latching means.

4. In a time-division multiplex system providing a plurality of channels each represented by a series of coded information pulses occurring in respective time slots, an arrangement for permitting all pulses of one or more selected channels to transmit information comprising:

a. means adapted to be connected to a source of information pulses of a selected channel of the system for determining if all but one of the information pulses of said selected channel have an undesired coded state and for producing a keep-alive signal in response thereto, and for determining if at least one of said all but one of the information pulses of said selected channel have a desired state and for producing a transmit signal in response thereto;

b. means connected to said determining means for transmitting a pulse of desired and predetermined coded state through said system at the time slot of the other one of said information pulses of said selected channel in response to said keep-alive signal;

c. and means connected to said determining means for transmitting a pulse indicating the desired information through said system at the time slot of said other one of said information pulses of said selected channel in response to said transmit signal.

5. In a time-division multiplex system providing a plurality of channels each represented by a series of coded information pulses occurring in respective time slots, an arrangement for utilizing all received pulses of one or more selected channels comprising:

a. means adapted to be connected to a source of received coded information pulses of a selected channel in the system for determining if all but one of the received information pulses of said selected channel have an undesired coded state and for producing a retaining signal in response thereto, and for determining if at least one of said all but one of the information pulses of said selected channel have a desired state and for producing a utilize signal in response thereto;

b. means connected to said determining means for retaining the previous pulse present in the time slot of the other one of said information pulses of said selected channel in response to said retaining signal;

c. means connected to said determining means for passing the pulse actually received in the time slot of said other one of said information pulses of said selected channel in response to said utilize signal;

d. and output means connected to said retaining means and said passing means.

* * * * *